(12) United States Patent
Mouquet et al.

(10) Patent No.: US 10,560,817 B2
(45) Date of Patent: Feb. 11, 2020

(54) VARIABLE VOLUME DATA TRANSMISSION IN A MOBILE COMMUNICATION NETWORK

(71) Applicant: Orange, Paris (FR)

(72) Inventors: Antoine Mouquet, Courbevoie (FR); Sanaa El Moumouhi, Paris (FR); Ali-Amine Mouafik, Boulogne Billancourt (FR)

(73) Assignee: ORANGE, Paris (FR)

( * ) Notice: Subject to any disclaimer, the term of this patent is extended or adjusted under 35 U.S.C. 154(b) by 65 days.

(21) Appl. No.: 15/774,849

(22) PCT Filed: Nov. 8, 2016

(86) PCT No.: PCT/FR2016/052883
§ 371 (c)(1),
(2) Date: May 9, 2018

(87) PCT Pub. No.: WO2017/081395
PCT Pub. Date: May 18, 2017

(65) Prior Publication Data
US 2019/0342726 A1    Nov. 7, 2019

(30) Foreign Application Priority Data
Nov. 10, 2015  (FR) ..................... 15 60766

(51) Int. Cl.
*H04W 4/20*    (2018.01)
*H04W 60/00*   (2009.01)
(Continued)

(52) U.S. Cl.
CPC ............. *H04W 4/20* (2013.01); *H04W 60/00* (2013.01); *H04W 68/005* (2013.01); *H04W 76/12* (2018.02)

(58) Field of Classification Search
CPC ..... H04W 4/20; H04W 60/00; H04W 68/005; H04W 76/12
See application file for complete search history.

(56) References Cited

U.S. PATENT DOCUMENTS 8,879,534 B2 * 11/2014 Marinier ................. H04L 47/36
                                                        370/338
9,549,424 B2 *  1/2017 Mademann ......... H04L 65/1006
(Continued)

FOREIGN PATENT DOCUMENTS

EP        2884780 A1    6/2015
WO     2013012759 A1    1/2013
(Continued)

OTHER PUBLICATIONS

English translation of the Written Opinion of the International Searching Authority dated Jan. 31, 2017 for corresponding International Application No. PCT/FR2016/052883, filed Nov. 8, 2016.
(Continued)

*Primary Examiner* — Khaled M Kassim
*Assistant Examiner* — Kai Chang
(74) *Attorney, Agent, or Firm* — David D. Brush; Westman, Champlin & Koehler, P.A.

(57) ABSTRACT

A method for transmitting data between a network node of a mobile communication network and a mobile terminal, implemented by the network node after receiving a data packet intended for the mobile terminal. The method includes: sending an alert message to the mobile terminal after receiving the data packet; receiving in response a service request from the mobile terminal; determining in accordance with a parameter received during a phase of attaching the mobile terminal to the network, a channel among a data transport channel and a signaling channel of the mobile network; when the data-transport channel is to be used, establishing a data-transport channel between the
(Continued)

mobile terminal and the network node and transmitting the data packet via the data-transport channel; and when the signaling channel is to be used, inserting the data to be transmitted into a signaling message and transmitting the signaling message towards the mobile terminal.

16 Claims, 3 Drawing Sheets

(51) Int. Cl.
    *H04W 68/00*     (2009.01)
    *H04W 76/12*     (2018.01)

(56) References Cited

U.S. PATENT DOCUMENTS

| | | | |
|---|---|---|---|
| 9,998,909 B2* | 6/2018 | Olsson | H04W 8/08 |
| 10,292,046 B2* | 5/2019 | Hole | H04W 72/04 |
| 2009/0010213 A1* | 1/2009 | Yamada | H04B 1/7143 |
| | | | 370/329 |
| 2012/0057496 A1* | 3/2012 | Jin | H04W 68/00 |
| | | | 370/252 |
| 2012/0093086 A1* | 4/2012 | Yin | H04L 69/16 |
| | | | 370/328 |
| 2013/0114533 A1* | 5/2013 | Ji | H04W 72/1263 |
| | | | 370/329 |
| 2014/0031069 A1* | 1/2014 | Yang | H04W 68/00 |
| | | | 455/458 |
| 2015/0263957 A1* | 9/2015 | Wang | H04W 4/90 |
| | | | 370/230 |
| 2016/0142977 A1* | 5/2016 | Hoffmann | H04W 52/0216 |
| | | | 370/311 |

FOREIGN PATENT DOCUMENTS

| | | |
|---|---|---|
| WO | 2014133651 A1 | 9/2014 |
| WO | 2015021276 A1 | 2/2015 |

OTHER PUBLICATIONS

International Search Report dated Jan. 31, 2017 for corresponding International Application No. PCT/FR2016/052883, filed Nov. 8, 2016.

Written Opinion of the International Searching Authority dated Jan. 31, 2017 for corresponding International Application No. PCT/FR2016/052883, filed Nov. 8, 2016.

English machine translation of the Decision to Grant for EP Application No. 16806258.6, dated Jan. 5, 2018.

3GPP TR 23.720 V1.1.0. "3rd Generation Partnership Project; Technical Specification Group Services and System Aspects| Architecture enhancements for Cellular Internet of Things (Release 13)." Oct. 2015.

* cited by examiner

VARIABLE VOLUME DATA TRANSMISSION IN A MOBILE COMMUNICATION NETWORK

CROSS-REFERENCE TO RELATED APPLICATIONS

This Application is a Section 371 National Stage Application of International Application No. PCT/FR2016/052883, filed Nov. 8, 2016, the content of which is incorporated herein by reference in its entirety, and published as WO 2017/081395 on May 18, 2017, not in English.

FIELD OF THE DISCLOSURE

The present invention relates to the field of data transmission in mobile communication networks, and more particularly to the transmission of data that may have variable volumes, in particular in cellular networks.

BACKGROUND OF THE DISCLOSURE

Modern mobile communication networks use an EPS ('Evolved Packet System') architecture, as defined by the standardization body 3GPP, that is based in particular on the distinction between a signalling channel used only to exchange signalling data between the various devices of the network and a user data transport channel used only to exchange payload data with the mobile terminals connected to the network.

Payload data are thus normally transmitted to a mobile terminal in a transport plane, by way of a data transport channel set up between this mobile terminal and the network entity managing access to the networks external to the mobile network.

FIG. 1 illustrates such a data transport channel, also called 'Data Radio Bearer' or 'EPS Bearer' in the 3GPP standards. In this figure, this data transport channel is carried by the radio interface Uu linking the mobile terminal UE and a base station eNB in the access network part RAN of the mobile network, and then by the interface S1-U linking the base station eNB to the core network part EPC of the mobile network, as far as the service gateway S-GW and the data gateway P-GW, the latter then being used to receive or transmit the data to another external network EXT, for example the Internet.

With regard to the signalling channel employed in the EPS architecture, said channel is based on a logical channel carried by the radio interface Uu, an interface, termed 'S1-MME', linking the base station and a mobility management entity MME situated in the core network part EPC of the mobile network.

With such an architecture, for each terminal, a transport channel is set up only when data are transmitted or received by this terminal, exchanges on the signalling channel being necessary to set up this transport channel before the data transmission and to deactivate it at the end of the data transmission.

The ongoing development of IoT (or 'Internet of Things' in English) uses makes it possible to contemplate applications that implement transmissions, by a multitude of simple terminals such as sensors, of very small volumes of data, possibly contained in a single IP packet, in contrast to conventional transmissions of voice, image or video data that involve smartphones.

The EPS architecture outlined above is not suitable for this type of transmission of small volumes of data insofar as, even to transmit a small amount of data contained in a single IP packet, it is still necessary to exchange signalling messages between the terminal and the network in order to restore and then to deactivate the transport channel.

In order to improve the effectiveness of the transportation of small volumes of data, in particular in terms of power consumption of the terminal, a solution specific to this type of use alone, called 'Infrequent small data transmission using pre-established NAS security', has been presented in the 3GPP technical report TR 23.720 v1.1.0 (clause 6.2).

This solution is based on the introduction of a network entity specific to the transmission of IoT data (in other words low-volume data), denoted 'C-SGN', which enables terminals specifically dedicated to this type of use to exchange low-volume data with a mobile network by encapsulating them in signalling messages exchanged with the C-SGN entity, so as to avoid setting up a transport channel.

Such a solution may be advantageous when a very low volume of data has to be transferred, typically when the data fit into a single IP packet. By contrast, if it turns out that the volume of data to be transferred is greater and becomes large, this solution leads to a multiplication of the signalling messages exchanged, thereby possibly leading to greater occupation of the radio link (and therefore a greater power consumption), which would be the case if a conventional transport channel were used to transmit the data.

Application WO 2013/012759 moreover describes a network architecture in which an SPDS ('Short Packet Data Service') server is introduced, this server being able to determine that downlink packets have to be transmitted via a signalling channel rather than via a transport channel. When this is the case, this SPDS server dialogs with the MME mobility management entity of the mobile network in accordance with a specific protocol (termed SPDS-AP) so as to transmit to it the low-volume packets to this entity. The MME entity, receiving such packets, then has to send, to the recipient terminal, a 'paging' message that is specially modified in order to inform it of the arrival of this specific type of downlink packet.

This mechanism therefore requires burdensome protocol modifications, be this at the MME entity, so that this entity is able not only to dialog with the SPDS server in accordance with the SPDS-AP protocol but also to modify, on a case-by-case basis, the 'paging' messages that it sends to the mobile terminals during a downlink connection, but also at the mobile terminals themselves, so that the latter are able to interpret the modified 'paging' messages that the MME entity sends to them when there are downlink packets to be transmitted on a signalling channel.

Furthermore, this mechanism is triggered by the SPDS server upon the arrival of data considered to be low-volume. Now, between the time when the SPDS server begins the dialog with the MME entity in accordance with the SPDS-AP protocol and the time when the terminal UE returns an extended service request in order to obtain the downlink data via a signalling channel, this situation may develop, with for example an influx of additional downlink data invalidating the decision of the SPDS server and making the transmission of all of these downlink data via a data transport channel more appropriate. Even if the SPDS server decides to reverse its selection decision, a certain amount of downlink data will already have been transmitted via a signalling channel set up for this purpose, while it is not the most suitable transmission mode.

At the present time, there is therefore not a device that is capable of flexibly, effectively and easily processing both the transmission of low volumes of data and the transmission of high volumes of data within a mobile network.

SUMMARY

The aim of the present invention is to improve this situation.

To this end, it proposes a method for transmitting data between a network node of a mobile communication network and a mobile terminal, implemented by the network node following the reception of at least one data packet intended for the mobile terminal, the method including the transmission of an alert message to the mobile terminal following the reception of said at least one data packet and the reception, in response, of a service request from the mobile terminal, this method furthermore including the following steps, following the reception of the service request from the mobile terminal:

determining, depending on the volume of the data to be transmitted or on a parameter received during a phase of attachment of said mobile terminal to the network, a channel to be used to transmit the data from a data transport channel and a signalling channel of the mobile network;

triggering the setup of a data transport channel between the mobile terminal and the network device and transmitting said at least one data packet by way of said data transport channel when a data transport channel is to be used;

inserting the data to be transmitted into at least one signalling message and transmitting said at least one signalling message to the mobile terminal when a signalling channel is to be used.

This method enables simplified selection of the transmission mode to be used for downlink data, not involving a change of protocol regarding the first exchanges with the mobile terminal for which the downlink packets are intended. This selection is moreover more reliable, as it takes place at a later stage of the process of connecting the mobile terminal to the network, and therefore with more insight with regard to the data transmission context.

In one particular embodiment, the determination of the channel to be used comprises the following steps:

determining the volume of the data to be transmitted; and comparing this volume with a decision threshold volume, a data transport channel being used when this volume is greater than the decision threshold volume and a signalling channel being used when this volume is lower than the decision threshold volume.

Advantageously, this method furthermore comprises the following steps, implemented by the network node and prior to the determination of the channel to be used:

triggering the storage of the at least one data packet, received by the network node, to be transmitted to the mobile terminal; and determining the volume of data to be transmitted by adding up the number of bytes of the stored data packets, or of the data that they contain, until the service request is received.

It is thus possible to make a more reliable decision with regard to the transmission mode to be employed, on the basis of the evaluation of the flow of downlink data until the time when the mobile terminal is ready to receive this flow, rather than relying on the volume of data in the entire first downlink packet received at the network node, which may not reflect the volume of data in the following downlink data flow.

As an alternative, the method furthermore comprises the following steps, implemented by the network node and prior to the determination of the channel to be used:

storing the at least one received data packet to be transmitted to the mobile terminal for a predetermined period;

the volume of data to be transmitted being calculated by adding up the number of bytes of the stored data packets, or of data that they contain.

This also makes it possible to make a more reliable decision, with regard to the transmission mode to be employed, than relying just on the volume of data in the entire first downlink packet received at the network node, by relying on a volume of data measured over a time frame, thus making it possible to discriminate the temporary effects of volume over this time frame.

In another particular embodiment, the network node determines that a signalling channel is to be used after having received, in an attachment request to attach the terminal to the network, during a phase of attachment of the terminal to the network, a parameter indicating that the data to be transmitted have a low volume and/or determines that a data transport channel is to be used after having received, in a request to attach the terminal to the network, a parameter indicating that the data to be transmitted have a high volume.

It is thus possible, for the mobile terminal, to influence the decision at the network level with regard to the selection of the downlink data transmission mode.

According to another subject of the present invention, a network node intended to be used in a mobile telecommunications network comprises a processing module able to receive at least one data packet to be transmitted to a mobile terminal, said processing module being configured to transmit an alert message to the mobile terminal following the reception of said at least one data packet and to receive, in response, a service request from the mobile terminal, the processing module of this node being configured, following the reception of the service request from the mobile terminal, to:

determine, depending on the volume of the data to be transmitted or on a parameter received from the mobile terminal during a phase of attaching said mobile terminal to the network, a channel to be used to transmit the data from a data transport channel and a signalling channel of the mobile network;

trigger the setup of a data transport channel with the mobile terminal and transmit said at least one data packet by way of said data transport channel when a data transport channel is to be used;

insert the data to be transmitted into at least one signalling message and transmit said at least one signalling message to the mobile terminal when a signalling channel is to be used.

According to another subject of the present invention, a mobile terminal, intended to be used with a mobile telecommunications network comprising a network node able to receive downlink data intended for this mobile terminal, comprises a processing module able to exchange data with the mobile network, the processing module being configured to insert, into a request to attach to the mobile telecommunications network, a parameter indicating whether the mobile terminal wishes to use a signalling channel or a data transport channel for the transmission of the downlink data, said parameter being intended to be used by the network node to determine the channel to be used to transmit the downlink data from a data transport channel and a signalling channel of the mobile network.

According to another subject of the present invention, a computer program includes code instructions for the implementation of the above data transmission method when this program is executed by a processing module of a network node. According to another subject of the present invention, a computer program includes code instructions for the implementation of the above method when this program is executed by a processing module of a network node, and a computer program medium able to be read by a processor.

BRIEF DESCRIPTION OF THE DRAWINGS

Other features and advantages of the invention will become apparent on reading the description detailed hereinafter of particular embodiments, given by way of nonlimiting example, and the appended figures, in which.

DETAILED DESCRIPTION OF ILLUSTRATIVE EMBODIMENTS

Figure 1:
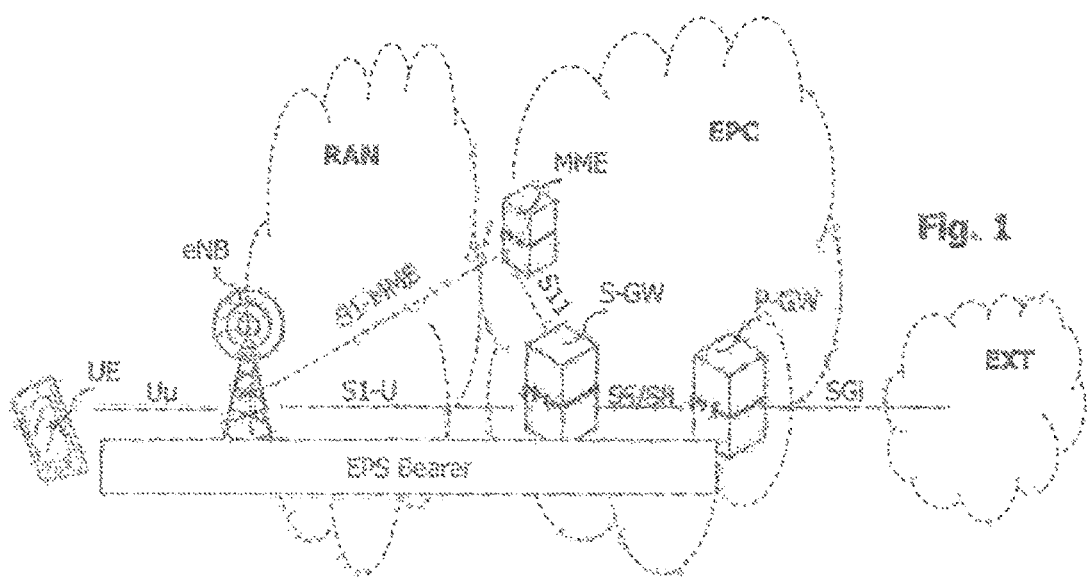
FIG. 1 is a schematic overview illustrating a typical data transport channel such as is used in a mobile communication network.
Figure 2:
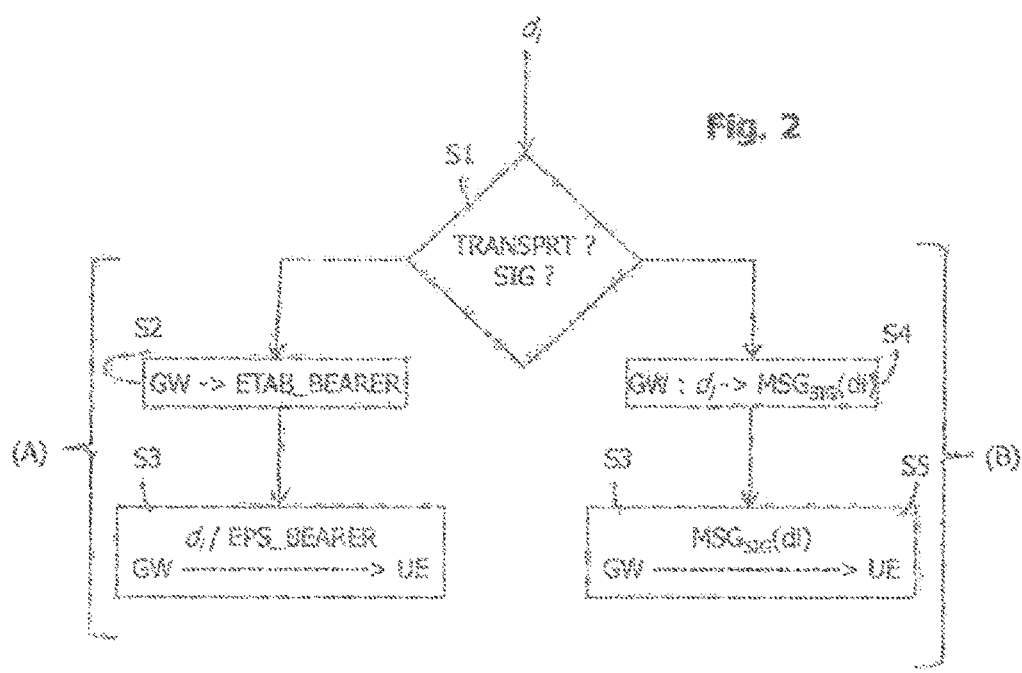
FIG. 2 illustrates the steps of the method according to the general principle of the present invention.

Reference is made first of all to FIG. 2, which illustrates the steps of the method according to the general principle of the present invention.

This method is employed in the context of the exchange of data between a mobile terminal UE (for example a smartphone, a tablet, a mobile telephone, a portable PC, communicating object, etc.), on the one hand, and a network node GW of a mobile communication network to which this mobile terminal connects, on the other hand. This network node GW is in particular situated in the core part of the mobile network, such that the exchanges transit via an access network RAN comprising a base station (or even eNodeB) to which the mobile terminal is able to connect via radio link. This network node GW may in particular be a gateway giving access to an external network, such that it is able to receive data packets intended for the terminal UE and coming from this external network, and to receive data packets coming from the terminal UE and intended to be transmitted to this external network.

In this method, following the provision, to the network node GW, of one or more packet(s) containing data $d_i$ to be transmitted to the mobile terminal UE (i.e. 'downlink' data), the network node GW determines (step S1), depending on the volume of the data to be transmitted, a transmission mode to be used from two possible modes:
  a first transmission mode A, in which the channel to be used to transmit the data is a data transport channel set up in the mobile network; in other words, the data is preferably transmitted in the transport plane;
  a second transmission mode B, in which the channel to be used to transmit the data is a signalling channel of the mobile network; in other words, the data is preferably transmitted in the signalling plane.

Once the transmission mode has been determined for the data packet(s) to be transmitted to the mobile terminal UE, this mode is used to transmit these data to this device.

Thus, if it is determined that the first transmission mode A is to be used (in other words, that a data transport channel is to be used), in particular when a high volume of data is to be transmitted, the network node GW triggers (step S2) the setup of a data transport channel between the mobile terminal and the network node, by way of signalling messages dedicated for this purpose, for example such as those described in documents TS 23.401 and TS 24.301.

Once the data transport channel has been set up, the network node GW transmits (step S3) the data packet(s) that have been provided thereto to the mobile terminal UE, within this transport channel, the data $d_i$ then being transmitted in the transport plane.

By contrast, if it is determined that the second transmission mode B is to be used (in other words, that a signalling channel is to be used), in particular when a low volume of data is to be transmitted, the network node GW inserts (step S4) the data that have been provided thereto into one or more signalling message(s) that are then transmitted (step S5) to the mobile terminal UE, in the signalling plane, therefore without having to set up a data transport channel in the transport plane.

Figure 3A:
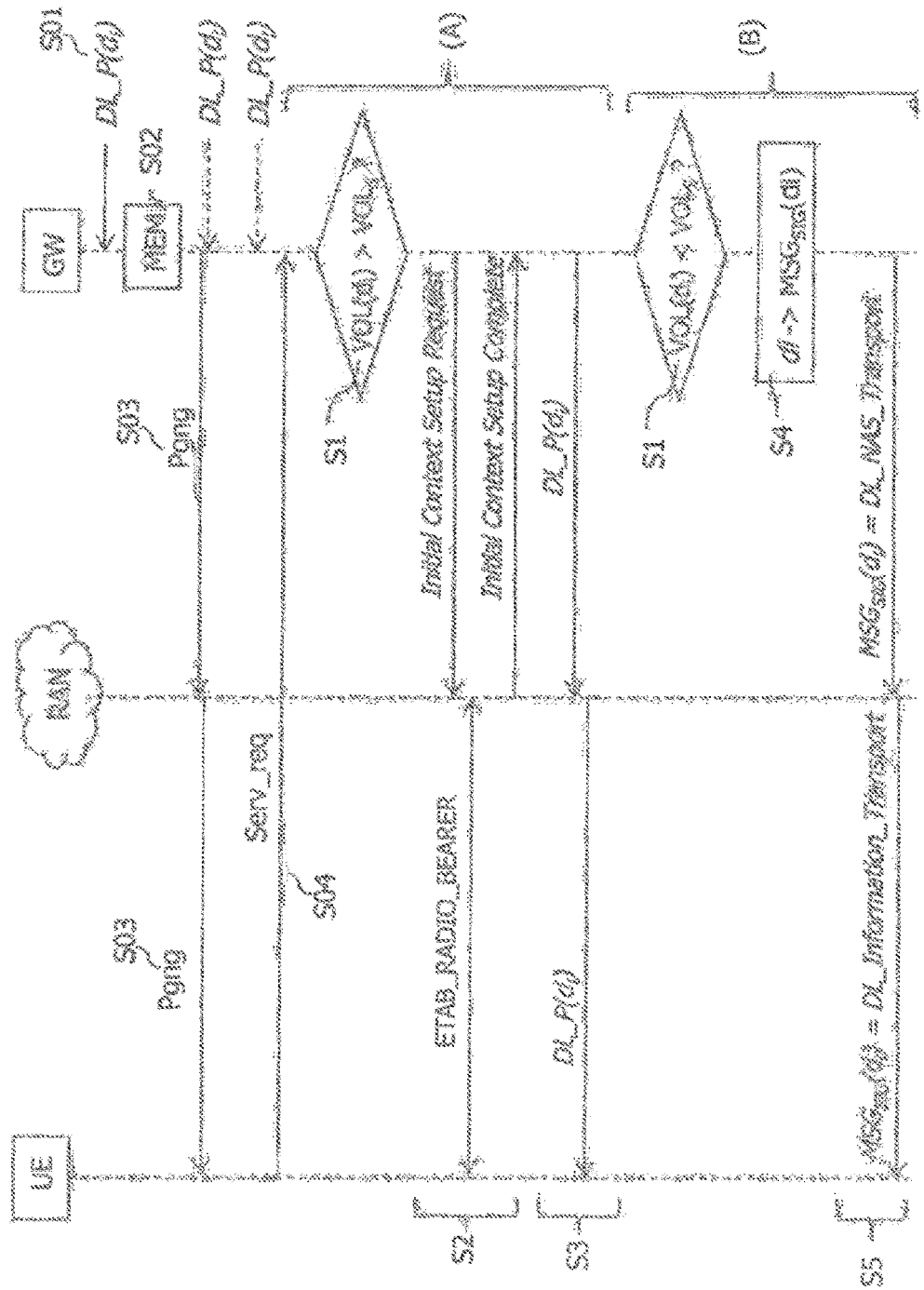
FIGS. 3A and 3B illustrate the steps of the method according to two embodiments of the invention, in which a network node transmits what are termed downlink data to a mobile terminal.
Figure 3B:
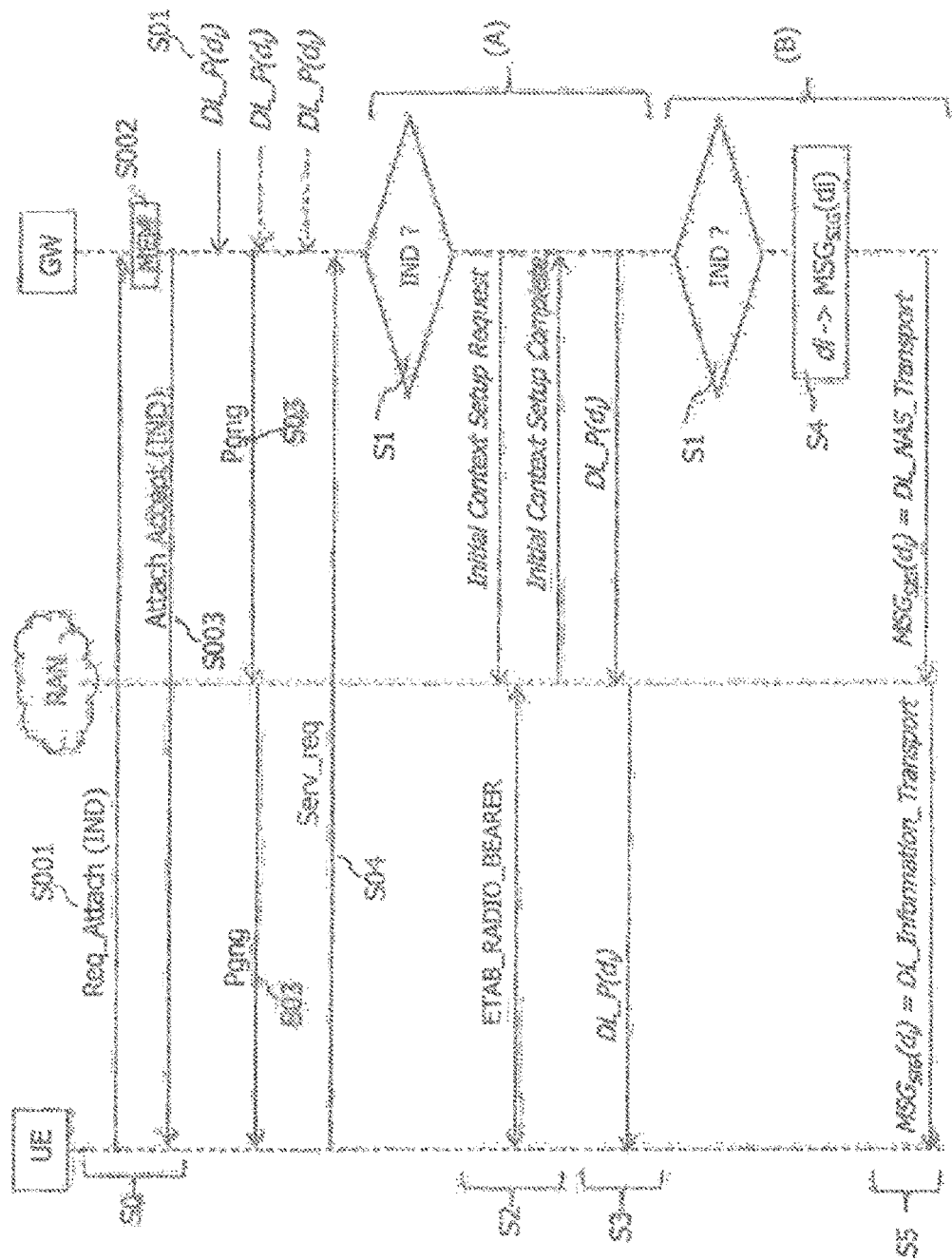

Reference will now be made to FIGS. 3A to 3B, illustrating the steps of methods according to two embodiments of the invention in which the network node GW receives 'downlink' data packets $DL\_P(d_i)$ to be transmitted to the mobile terminal UE. In this embodiment, the terminal UE is connected to the mobile communication network by way of an access network RAN comprising a base station, or eNodeB, to which the terminal UE is connected.

Reference is made firstly to FIG. 3A, illustrating a specific embodiment of a method for transmitting downlink data according to the invention, dynamically taking account of the volume of the data to be transmitted.

In this embodiment, the method is triggered in this case by the reception, by the network node GW (step S01), of a first data packet $DL\_P(d_i)$ intended for the terminal UE and containing payload data $d_i$ intended for this same terminal, this packet possibly coming from an external network, for example the Internet.

Following the reception of this first data packet, the network node GW triggers (step S02) the storage of this first packet, and of any other data packets $DL\_P(d_{i,1})$, $DL\_P(d_{i,2})$, etc. intended for the terminal UE that it may receive thereafter. This storage may correspond to buffer storage in a temporary storage module (or buffer) of the network node.

Furthermore, the network node GW transmits (step S03), to the terminal UE, an alert message Pgng, typically in the form of a 'paging' message, this message transiting via the access network RAN to which this terminal UE is connected via radio link. In response to this message, the terminal UE may return (step S04) a service request Serv_req, still via the access network RAN to which it is connected via radio link, in order in particular to indicate to the network node GW that it consents to receiving the data that are intended for it. The terminal UE then switches from the standby state to the connected state.

At this stage, the network node GW determines (step S1) the channel to be used to transmit the data packets $DL\_P(d_i)$ that it received for the terminal UE, as introduced previously in FIG. 2.

To this end, the network node GW may first of all determine the volume of the data to be transmitted to the terminal UE and deduce therefrom whether a low or a high volume is involved, by comparing it with a decision threshold volume $VOL_S$:
  if this volume is lower than this decision threshold volume $VOL_S$, it is considered that a low volume of data is to be transmitted, and therefore that a signalling channel is most suitable for transmitting these data.

if this volume is greater than this decision threshold volume $VOL_S$, then it is considered that a high volume of data is to be transmitted, and that a data transport channel is most suitable for transmitting these data.

The volume of the data to be transmitted may be determined by the network node GW in several ways.

In particular, it is possible to take into account all of the packets intended for the UE that are received starting from the first packet that triggers the transmission of the alert message Pgng until the time when the service request Serv_req is received. The volume of data $VOL(d_i)$ to be transmitted is then calculated by adding up the bytes of all of the data contained in these packets (possibly after having decapsulated and stored these data, so as to take account only of the payload part of the received data), or else by adding up the bytes of all of the received packets $DL\_P(d_i)$ as a whole when they have been stored in unaltered form upon reception thereof. With this volume then being expressed as a number of bytes, this volume is compared with a decision threshold volume $VOL_S$ also expressed as a number of bytes, for example 2000 bytes.

An alternative may consist in triggering a timeout of a predetermined period following the reception of the first data packet intended for the terminal UE, and in taking account only of data packets intended for the UE that are received and stored during this predetermined period. The calculation of the volume and the comparison with the threshold decision volume $VOL_S$ may then be performed in a manner similar to what is described above.

Two scenarios then arise, depending on the channel that is determined to be the one to be used to transmit the data packets to the terminal UE:

If the use of a data transport channel is determined to be suitable (a high volume of data to be transmitted), this corresponding to transmission mode A, the network node GW triggers (step S2) the setup of a data transport channel, for example by way of a conventional procedure drawing on the 3GPP standards. In this case, the network node GW transmits an initial context setup request to the access network RAN, which network then sets up a radio channel ('data radio bearer') with the terminal UE before returning, to the network node (if the radio channel is set up successfully), an initial context setup complete message.

At the end of these steps, a transport channel (i.e. an 'S1 Bearer') is set up from the terminal UE to the network node GW. The network node GW may then transmit (step S3) all of the data packets $DL\_P(d_i)$ that it has stored in the interval to the terminal UE, by way of this transport channel.

By contrast, when the use of a signalling channel is determined to be suitable (a low volume of data to be transmitted), this corresponding to transmission mode B, the network node GW does not trigger the setup of a transport channel, but prepares one or more signalling message(s) $MSG(d_i)$ by inserting (step S4) into them the data $d_i$, extracted from the received packets $DL\_P(d_i)$, to be transmitted to the terminal UE that it has been able to store up until this point.

The network node GW may in this case employ any type of signalling message capable of reaching the terminal UE and of containing low-volume data, for example 'NAS' messages, such as discussed in document TR 23.720 v1.1.0, in particular a 'downlink NAS transport' message to the access network RAN. Once this (or else these) signalling message(s) has/have been prepared, it is transmitted (step S5) to the terminal UE via the access network RAN, which network may possibly modify its format while preserving the data intended for the UE. Thus, in this case, the downlink NAS transport message is converted by the RAN into a downlink information transfer ('DL information transfer') message, transmitted via radio link to the terminal UE.

Reference is now made to FIG. 3B, illustrating another more static embodiment of a method for transmitting downlink data according to the invention.

The method in this embodiment is distinguished from the previous one in that the channel to be used is determined not depending on a volume of data, but depending on an indication transmitted beforehand by the terminal UE.

In this method, a prior phase S0 of attaching the terminal UE to the mobile network takes place, using a traditional process, so as to enable the terminal to connect to the network.

During this phase, the terminal UE transmits (step S001) an attachment request, relayed by the RAN to the network node GW. However, in the present embodiment, the terminal UE prepares this request by inserting a parameter IND into it that adopts a first value indicating that it wishes to use a signalling channel or a second value indicating that it wishes to use a data transport channel, for the downlink data that may be intended for it and that may be received by the network node GW.

The network node GW stores (step S002) this parameter in association with an identifier of the terminal UE (for example its IMSI) and returns (step S003) an attachment acceptance message, in which it reproduces the parameter IND so as to confirm the takeover of the chosen channel. If use of this channel is denied or not supported by the network, the network node GW does not reproduce the parameter IND in the attachment acceptance message.

Thereafter, when it receives a data packet $DL\_P(d_i)$ intended for the terminal UE, the network node may send an alert message and await a service request in return, as described above (steps S03 and S04).

The network node GW then checks whether it has stored a parameter IND in association with the identifier of the recipient terminal UE for the packets. If an identifier IND whose value indicates a wish to transmit via signalling channel has been stored, the network node GW triggers steps S4 and S5 described above so as to use a signalling channel. If, by contrast, an identifier IND whose value indicates a wish to transmit via transport channel has been stored, the network node GW triggers steps S2 and S3 described above so as to use a data transport channel.

As an alternative, it may be contemplated that a signalling channel is to be used by default for the downlink data, in the absence of an indicator, a transport channel being used only in the presence of an indicator, or vice versa.

The parameter indicating the wish for a channel to be used, to transmit the downlink data, may be established when determining the channel to be used for any type of downlink data. As an alternative, this parameter may be a wish for a channel to be used, unless there is an order to the contrary inserted with the downlink packets or a particular situation. By way of example, a terminal UE designed for low volumes of data (for example a sensor transmitting temperatures on a regular basis) may indicate to the network its wish to use a signalling channel, but the network node GW may possibly decide to ignore this wish and to give precedence to a data transport channel to intermittently transmit large high-volume data, such as a firmware update for the terminal, for example.

To implement the method described above, the network node GW may take the form of a device comprising a processing module (for example a processor) associated with a read-only memory module in which there may be stored the code instructions of a computer program that the processing module is able to execute in order to implement the steps of the above method, and a random-access memory module in which there may be stored the downlink data, or the downlink packets, to be processed in accordance with the above method. The processing module may be individual or be broken down into a plurality of modules (or processors), possibly distributed in a plurality of devices and responsible for executing one or more of the steps of the above method.

For its part, the mobile terminal UE may comprise in particular two separate modules:

Firstly, one (or possibly a plurality of) application module APP (just one being illustrated in this case), typically corresponding to a software application installed or embedded in the terminal UE and capable of processing data (possibly provided via a user interface or originating from a sensor) and of providing data to the other modules of the terminal UE.

Secondly, a processing module COM comprising in particular a radio communication module (typically comprising a radio station, an antenna, an oscillator, etc.) whose function is to communicate with the mobile network via radio link. This processing module COM may be implemented in the form of a processor associated with a read-only memory, and a random-access memory, in which there may be stored a computer program comprising instructions for executing the various steps of the below method when it is executed by the processor.

The application module APP and the processing module COM may be integrated on one and the same chip (chipset).

In this case, in the embodiment illustrated in FIG. 3B, the processing module COM is configured to insert the parameter IND described above into the attachment requests transmitted to the mobile network so as to enable the terminal UE to attach to this network.

Of course, the invention is not limited to the exemplary embodiments described and shown above and on the basis of which it is possible to provide other embodiments and forms of implementation without otherwise departing from the scope of the invention.

Thus, the method for transmitting downlink data may apply equally to the payload data di themselves and to the packets (for example IP packets) that contain them. In particular, the signalling message according to the invention may contain equally the data extracted from the packets provided and the packets as a whole, when their size allows this. By contrast, in the transport plane, it is equally possible to retransmit the packets provided in the transport channel and to transmit the payload data, extracted from these packets, in such a transport channel.

Furthermore, the network node GW has been described above as a single network entity. However, it is quite possible to implement the functions described above that it performs by using a plurality of separate entities. In particular, a first network entity (for example an S-GW gateway) could be responsible for receiving the downlink packets, storing them while awaiting the determination, calculating the volume of the data to be transmitted and retransmitting these packets, where necessary, in a transport channel, while a second network entity (for example an MME mobility management entity) may be responsible for comparing the volume of data to be transmitted with a transmission threshold volume, instructing the first network entity to transmit the data in a data transport channel if such a channel is to be used, or inserting and transmitting the data in a signalling message if a signalling channel is to be used. Any other distribution of these functions between these two, or more, network entities is able to be contemplated without otherwise departing from the scope of the present invention.

Although the present disclosure has been described with reference to one or more examples, workers skilled in the art will recognize that changes may be made in form and detail without departing from the scope of the disclosure and/or the appended claims.

The invention claimed is:

1. A method for transmitting data from a mobile communication network to a mobile terminal, the method comprising the following acts, implemented by a first network entity of said mobile communication network:
   transmitting an alert message to the mobile terminal following the reception, by a second network entity of the mobile communication network, of at least one data packet intended for the mobile terminal;
   receiving, in response to the alert message, a service request from the mobile terminal; and
   following the reception of the service request from the mobile terminal:
      determining, depending on a parameter received during a phase of associating said mobile terminal with the network and on a volume of data to be transmitted, whether to use a data transport channel or signalling messages of the mobile network in order to transmit the data of the at least one data packet;
      triggering a setup of a data transport channel between the mobile terminal and said second network entity of said mobile communication network and transmitting said at least one data packet by way of said data transport channel when the data transport channel is to be used;
      inserting the data to be transmitted into at least one signalling message and transmitting said at least one signalling message to the mobile terminal when the signalling messages are to be used.

2. The method as claimed in claim 1, wherein the act of determining includes:
   determining the volume of the data to be transmitted; and
   comparing said volume with a decision threshold volume, the data transport channel being used when said volume is greater than the decision threshold volume and the signalling messages being used when said volume is lower than the decision threshold volume.

3. The method as claimed in claim 2, furthermore including the following acts, implemented by one of said first and second network entities prior to the act of determining the channel to be used:
   triggering storage of the at least one data packet, received by the network entity, to be transmitted to the mobile terminal; and
   determining the volume of data to be transmitted by adding up a number of bytes of the stored data packets, or of the data that they contain, until the service request is received.

4. The method as claimed in claim 2, furthermore including the following acts, implemented by one of said first and second network entities and prior to the act of determining the channel to be used:
   storing the at least one received data packet to be transmitted to the mobile terminal for a predetermined period;

the volume of data to be transmitted being calculated by adding up a number of bytes of the stored data packets, or of data that they contain.

5. The method as claimed in claim 1, wherein the first network entity determines that a signalling messages are to be used after having received, in a request to associate the terminal with the network, during a phase of associating the terminal with the network, a parameter indicating that the data to be transmitted have a low volume and/or determines that a data transport channel is to be used after having received, in a request to associate the terminal with the network, a parameter indicating that the data to be transmitted have a high volume.

6. The method as claimed in claim 1, further comprising the act of receiving said at least one data packet intended for the mobile terminal by said second network entity, the alert message being transmitted to the mobile terminal following the reception by said second entity of said at least one data packet intend for the mobile terminal.

7. The method as claimed in claim 1, wherein the first network entity is a mobility management entity of the mobile communication network and the second network entity is a gateway of the S-GW type.

8. The method as claimed in claim 1, wherein the first and second network entities are implemented in a single network node.

9. A first network entity configured to be used in a mobile communications network, the first network entity comprising:
   a processor;
   a non-transitory computer-readable medium comprising instructions stored thereon, which when executed by the processor configure the first network entity to perform acts comprising,
   following reception of at least one data packet by the first network entity or a second network entity of the mobile communication network:
   transmitting an alert message to the mobile terminal;
   receiving, in response to the alert message, a service request from the mobile terminal, following the reception of the service request from the mobile terminal:
   determining, depending on a parameter received from the mobile terminal during a phase of associating said mobile terminal with the network and on a volume of data to be transmitted, whether to use a data transport channel or signalling messages of the mobile network in order to transmit said data of the at least one data packet;
   triggering a setup of a data transport channel with the mobile terminal and a transmission of said at least one data packet by way of said data transport channel, when a data transport channel is to be used;
   inserting the data to be transmitted into at least one signalling message and transmitting said at least one signalling message to the mobile terminal, when signalling messages are to be used.

10. The network entity as claimed in claim 9, wherein said first network entity is a mobility management entity of the mobile communication network.

11. A mobile terminal configured to be used with a mobile communications network comprising a network entity able to receive downlink data intended for the mobile terminal, the mobile terminal comprising:
   a processor able to exchange data with the mobile network;
   a non-transitory computer-readable medium comprising instructions stored thereon, which when executed by the processor configure the mobile terminal to perform acts comprising:
   inserting, into a request to associate with the mobile communications network, a parameter indicating whether the mobile terminal wishes to use signalling messages or a data transport channel for the transmission of the downlink data,
   receiving an alert message from a first network entity of the mobile communication network following reception of at least one data packet of downlink data by a second entity of the mobile communication network;
   transmitting, in response to the alert message, a service request to the first network entity; and
   following the transmission of the service request and depending on the parameter inserted into the request to associate the mobile terminal with the mobile communications network and on a volume of data to be transmitted, receiving said at least one data packet by way of a data transport channel set up between the mobile terminal and a second network entity of the mobile communication network or receiving from the first network entity at least one signalling message in which the data of the at least one data packet is inserted.

12. The mobile terminal according to claim 11, wherein the first network entity is a mobility management entity of the mobile communication network and the second network entity is a gateway of the S-GW type.

13. The mobile terminal according to claim 11, wherein the first and second network entities are implemented in a single network node.

14. The mobile terminal according to claim 11, wherein, when the mobile terminal wishes to receive the downlink data by way of signaling messages, the parameter adopts a value indicating that it wishes to use the signaling messages to transmit downlink data.

15. The mobile terminal according to claim 11, wherein, when the mobile terminal wishes to receive the downlink data by way of a data transport channel set up with the mobile network, the parameter adopts a value indicating that it wishes to use the data transport channel to transmit downlink data.

16. A non-transitory computer-readable medium comprising a computer program stored thereon, including code instructions for implementation of a method for transmitting data from a mobile communication network to a mobile terminal, when this program is executed by a processor of a first network entity of said mobile communication network, wherein the instructions configure the first network entity to perform acts comprising,
   following reception of at least one data packet intended for the mobile terminal by a second network entity of the mobile communication network:
   transmitting an alert message to the mobile terminal;
   receiving, in response to the alert message, a service request from the mobile terminal; and
   following the reception of the service request from the mobile terminal:
   determining, depending on a parameter received during a phase of associating said mobile terminal with the network and on a volume of data to be transmitted, whether to use a data transport channel or signalling messages of the mobile network in order to transmit said data of the at least one data packet;
   triggering a setup of a data transport channel between the mobile terminal and said network entity and transmitting said at least one data packet by way of said data transport channel, when the data transport channel is to be used;

inserting the data to be transmitted into at least one signalling message and transmitting said at least one signalling message to the mobile terminal, when signalling messages are to be used.

\* \* \* \* \*